Patented Mar. 15, 1949

2,464,747

UNITED STATES PATENT OFFICE 2,464,747

VINYL ETHER-PHOSGENE INTERPOLYMERIZATION PRODUCTS AND PROCESS OF PRODUCING THE SAME

Frederick Grosser, Easton, Pa., assignor to General Aniline & Film Corporation, New York, N. Y., a corporation of Delaware No Drawing. Application November 29, 1945, Serial No. 631,779

6 Claims. (Cl. 260—90)

The present invention relates to novel interpolymerization products of vinyl or other ethylenically-unsaturated ethers with phosgene and a method of producing the same.

I have discovered that new and useful interpolymerization products are obtained when an ethylenically-unsaturated ether and phosgene are interpolymerized. These new interpolymers are brown, insoluble, rubbery solids which can be worked in a rubber mill, preferably with plasticizers such as polyvinyl isopropyl ether, and molded into rubber-like articles.

As ethylenically-unsaturated ethers which are suitable for use in the present invention, may be cited those ethers having the formula

$$R—O—CR^1=CR^2R^3$$

in which R, $R^1$, $R^2$ and $R^3$ stand for an alkyl, aryl or aralkyl group and $R^1$, $R^2$ or $R^3$ also may be hydrogen. Specific examples of such ethers are the vinyl ethers of such aliphatic alcohols as methyl, ethyl, propyl, isopropyl, butyl, isobutyl, cyclohexyl, lauryl and stearyl alcohol or of such organic hydroxy compounds as phenol, cresol, benzyl alcohol, cinnamic alcohol and the like. As examples of ethylenically-unsaturated ethers in which $R^1$, $R^2$ or $R^3$ is an alkyl, aryl or aralkyl group, may be mentioned the ethers of propenyl, butenyl, beta-phenyl, beta-benzyl and similar alcohols with the alkyl, aryl, or aralkyl alcohols mentioned above.

While neither the vinyl ethers nor phosgene is readily polymerized under the conditions employed for producing these novel interpolymers, I have found that a mixture of an ethylenically-unsaturated ether and phosgene may readily be polymerized by slightly heating the same, preferably in a closed system. The exact temperature of heating is not highly critical and it may be varied through a relatively wide range. In general, temperatures of from 40 to 60° C. are satisfactory and permit the polymerization to be carried out in a reasonable time with a good yield of polymeric material. Likewise, the relative proportions of the ethylenically-unsaturated ether and phosgene are not highly critical and may be varied through a relatively wide range. Satisfactory interpolymers have been prepared when the relative proportions of ethylenically-unsaturated ether and phosgene were varied within the range of 1:1 to 10:1. If desired, the polymerization may be carried out in the presence of inert organic solvents, such as chloroform, benzene, toluene, petroleum naphtha and the like.

The following specific examples illustrate preferred embodiments of the present invention:

Example 1

A mixture of isopropyl vinyl ether and phosgene having a molar ratio of 3:1 was heated to a temperature of 45 to 50° C. for 23 hours. There was obtained 76% of a soft brown tacky solid resin which was insoluble in benzene, acetone, chloroform and other common organic solvents.

Example 2

A mixture of isopropyl vinyl ether and phosgene having a molar ratio of 7.5:1 was heated to 45 to 50° C. for 40 hours. There was obtained 69% of a dark brown, rubbery solid resin which was insoluble in common organic solvents.

Example 3

A mixture of .75 moles of isopropyl vinyl ether, 0.1 mole of phosgene and 1 mole of chloroform was heated to 45 to 50° C. for 18 hours. There was obtained 60% of a black, rubbery, non-tacky solid resin which was insoluble in common organic solvents.

I claim:

1. A method of polymerization which comprises slightly heating a mixture of phosgene with an ethylenically-unsaturated ether having the formula $R—O—CR^1=CR^2R^3$, in which R stands for a member of the group consisting of alkyl, aryl and aralkyl radicals and $R^1$, $R^2$ and $R^3$ each stands for a member of the group consisting of hydrogen and alkyl, aryl and aralkyl radicals, the molar ratio of said ether to said phosgene being within the range of 1:1 to 10:1.

2. The interpolymerization products obtained in accordance with claim 1.

3. A method of polymerization which comprises heating to a temperature of 40–60° C. a mixture of a vinyl ether of an aliphatic alcohol and phosgene in molar proportions of 1:1 to 10:1.

4. The interpolymerization products obtained in accordance with claim 3.

5. A method of polymerization which comprises heating to a temperature of 40–60° C. a mixture of isopropyl vinyl ether and phosgene in molar proportions of 1:1 to 10:1.

6. The interpolymerization products obtained in accordance with claim 5.

FREDERICK GROSSER.

No references cited.